US005444821A

United States Patent [19]
Li et al.

[11] Patent Number: 5,444,821
[45] Date of Patent: Aug. 22, 1995

[54] ARTIFICIAL NEURON ELEMENT WITH ELECTRICALLY PROGRAMMABLE SYNAPTIC WEIGHT FOR NEURAL NETWORKS

[75] Inventors: Zhi-Jian Li; Bing-Xue Shi; Yang Wang, all of Beijing, China

[73] Assignee: United Microelectronics Corp., Hsin Chu, China

[21] Appl. No.: 150,460

[22] Filed: Nov. 10, 1993

[51] Int. Cl.6 .............................................. H03K 19/08
[52] U.S. Cl. .......................................... 395/24; 345/27
[58] Field of Search ..................... 307/201; 295/24, 27

[56] References Cited
U.S. PATENT DOCUMENTS

| | | | |
|---|---|---|---|
| 4,961,002 | 10/1990 | Tam | 395/24 |
| 4,999,525 | 3/1991 | Park | 307/201 |
| 5,028,810 | 7/1991 | Castro | 307/201 |
| 5,120,996 | 6/1992 | Mead | 307/201 |
| 5,155,377 | 10/1992 | Castro | 307/201 |

Primary Examiner—Edward P. Westin
Assistant Examiner—Andrew Sanders
Attorney, Agent, or Firm—Ladas & Parry

[57] ABSTRACT

A neuron element with electrically programmable synaptic weight for an artificial neural network features an excitatory-connection floating-gate transistor and an inhibitory-connection floating-gate transistor. The control gate electrodes of the two transistors are connected together, and the drain electrode of the inhibitory-connection transistor is connected to the source electrode of the excitatory-connection transistor. Both of the excitatory-connection and inhibitory-connection transistors have programming electrodes. The control gate electrodes and the programming electrodes can be utilized to program the threshold voltages of the transistors and thus the synaptic weight of the neuron element.

2 Claims, 2 Drawing Sheets

ARTIFICIAL NEURON ELEMENT WITH ELECTRICALLY PROGRAMMABLE SYNAPTIC WEIGHT FOR NEURAL NETWORKS

BACKGROUND OF THE INVENTION

The present invention relates to an artificial neuron element for neural networks, and more particularly to an artificial neuron element with electrically programmable synaptic weight.

Artificial neural network models have been studied for many years in the hope of achieving human-like performance in the fields of speech and image recognition. An artificial neural network is a massively parallel array of simple computational elements (neurons) that models some of the functionality of the human nervous system and attempts to capture some of its computational synaptic strengths or weights. The abilities that an artificial neural netmight aspire to mimic include the ability to consider many solutions simultaneously, the ability to work with corrupted or incomplete data without explicit error correction, and a natural fault tolerance.

Neural network implementations fall into two broad categories, digital and analog. Digital neural networks and analog neural networks have the following strengths and weaknesses respectively, as described in the literature "Asynchronous VLSI Neural Networks Using Pulse-Stream Arithmetic", A. F. Murray and A. V. W. Smith, *IEEE Journal of Solid-State Circuits*, Vol. 23, No. 3, pp. 688–697, 1988. The strengths of a digital approach are:

Design techniques are advanced, automated, and well-understood;
Noise immunity is high;
Computational speed can be very high; and
Learning networks can be implemented readily.

However, for digital neural networks, there are several unattractive features:

Digital circuits of this complexity must be synchronous, while real neural nets are asynchronous;
All states, activities, etc. in a digital network are quantized; and
Digital multipliers, essential to the neural weighting function, occupy a large silicon area.

The benefits of analog networks are:
Asynchronous behavior is automatic;
Smooth neural activation is automatic; and
Circuit elements can be small.

Drawbacks to analog neural networks include:
Noise immunity is slow;
Arbitrarily high precision is not possible; and
Worst of all, no reliable analog, nonvolatile memory technology exists.

Biological neural nets, by their nature, are nonlinear, and are typically analog. At present, however, the rich properties of neural networks associated with massively parallel processing using analog neurons and synapses have not been fully explored. To make neural computing hardware more powerful, compact and electrically programmable synapses are needed. By using programmable neural chips with weight-adjustable neurons and adaptive synapses, reconfigurable neural systems with learning capabilities can be constructed.

Therefore, the present invention is directed toward the development of a viable method of storing neural network weights or network connection strengths in analog form by using digital circuit technology to facilitate the integrated circuit design:

SUMMARY OF THE INVENTION

The primary object of the present invention is to provide an artificial neuron element with electrically programmable synaptic weight for neural networks, which utilizes two floating-gate MOS transistors to form the basic neuron structure. The same neuron elements can be easily connected to form a neural network chip.

In accordance with the present invention, a neuron element with electrically programmable synaptic weight for an artificial neural network comprises:

an excitatory-connection floating-gate transistor having a floating gate, a control gate electrode adapted to receive an input signal, a drain electrode adapted for connection to a power source voltage, a source electrode adapted for connection to an output line, and a programming electrode connected to the source electrode, the control gate electrode and the programming electrode capable of being utilized to program the threshold voltage of the excitatory-connection floating-gate transistor, and thus the synaptic weight of the neuron element; and an inhibitory-connection floating-gate transistor having a floating gate, a control gate electrode adapted to receive an input signal, a drain electrode connected to the source electrode of the excitatory-connection floating-gate transistor, a source electrode adapted for connection to ground, and a programming electrode, the control gate electrode and the programming electrode of the inhibitory-connection floating-gate transistor capable of being utilized to program the threshold voltage of the inhibitory-connection floating-gate transistor, and thus the synaptic weight of the neuron element.

According to one aspect of the present invention, the excitatory-connection and inhibitory-connection floating-gate transistors are NMOS transistors.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

Figure 1:
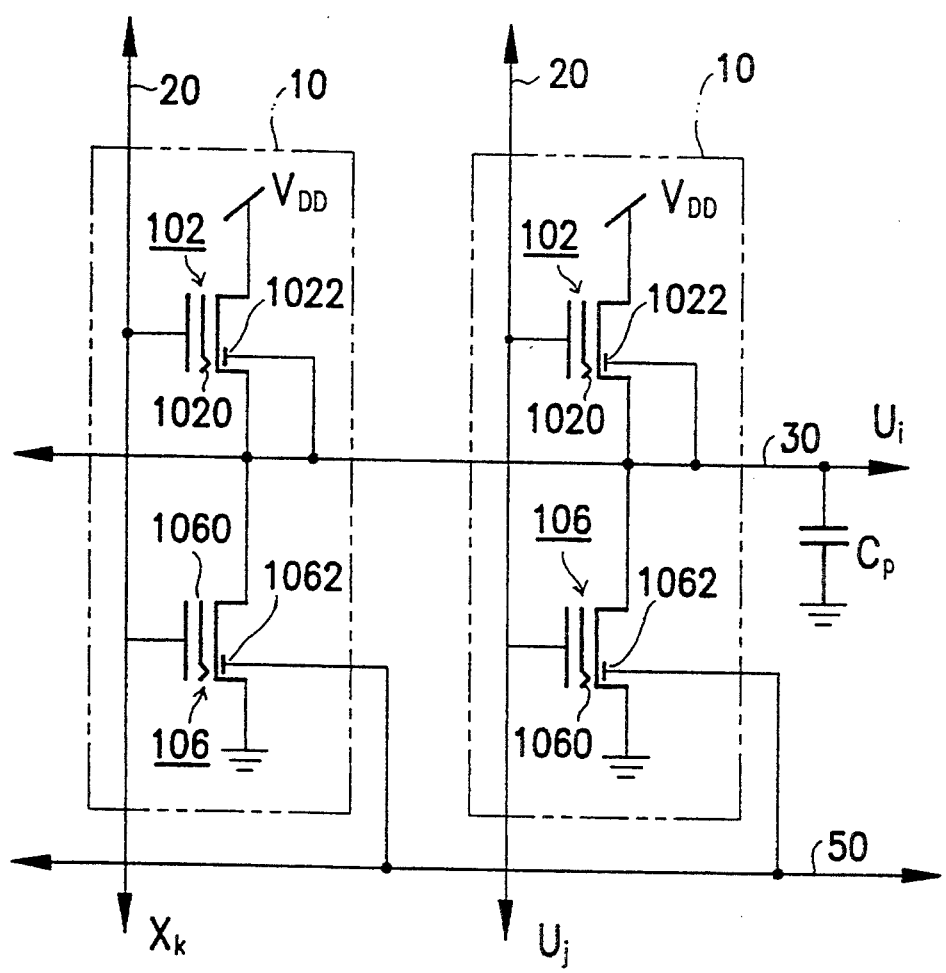
FIG. 1 is an electrical circuit schematic diagram of two basic neuron elements according to one preferred embodiment of the present invention.

Referring now to FIG. 1, there are shown two basic neuron elements according to one preferred embodiment of the present invention. As shown in FIG. 1, since the two basic neuron elements are identical, they are designated the same reference number 10. Each basic neuron element 10 includes an excitatory-connection floating-gate NMOS transistor 102 and an inhibitory-connection floating-gate NMOS transistor 106. The excitatory-connection transistor 102 has a floating gate 1020, a drain electrode connected to a power source voltage $V_{DD}$, a control gate electrode connected to a control line or input signal line 20, and a source electrode connected to an output line 30. The inhibitory-connection transistor 106 has a floating gate 1060, a drain electrode connected to the output line 30 and the source electrode of the excitatory-connection transistor 102, a control gate electrode connected to the control line 20, and a source electrode connected to ground.

As is known in this art, the memory behavior of a floating-gate MOS transistor is implemented by storing a charge on its floating gate. The floating gate is totally isolated by the surrounding layers of oxide and acts as a capacitor with long-term charge retention capability. The amount of charge trapped on the floating gate can be changed by means of injection and removal of electrons through the insulating oxide via a process known as Fowler-Nordheim tunneling. A high electric field within the oxide, typically greater than $6.4 \times 10^8$ V/m for $SiO_2$, is required for electrons to have a significant probability of tunneling through the oxide. This ability to retain and vary the trapped charge satisfies the basic requirements of neural weight value storage.

In this preferred embodiment, the excitatory-connection transistor 102 is provided with a programming electrode 1022 connected to the output line 30 or its source electrode for individual programming purposes. That is to say, the excitatory-connection NMOS floating-gate transistor 102 of the present invention does not utilize its drain/source electrodes to program its threshold voltage. Applying appropriate voltages to the control line 20 and the output line 30 can vary the trapped charge on the floating gate 1020, and thus vary the threshold voltage of the excitatory-connection transistor 102. For example, if a positive voltage is applied to the control line 20, and a negative voltage is applied to the output line 30, the threshold voltage of the excitatory-connection transistor 102 is increased. If a negative voltage is applied to the control line 20, and a positive voltage is applied to the output line 30, the threshold voltage of the excitatory-connection transistor 102 is decreased. Similarly, the inhibitory-connection transistor 106 is provided with a programming electrode 1062 connected to an individual programming line 50 for programming purposes. That is to say, the inhibitory-connection NMOS floating-gate transistor 106 of the present invention does not utilize its drain/source electrodes to program its threshold voltage. Applying appropriated voltages to the control line 20 and the programming line 50 can vary the trapped charge on the floating gate 1060, and thus the threshold voltage of the inhibitory-connection transistor 106. For example, if a positive voltage is applied to the control line 20, and a negative voltage is applied to the programming line 50, the threshold voltage of the inhibitory-connection transistor 106 is increased. If a negative voltage is applied to the control line 20, and a positive voltage is applied to the programming line 50, the threshold voltage of the inhibitory-connection transistor 106 is decreased. The amount of charge trapped on the floating gate can be controlled by controlling the direction, amplitude, and operating time of tunneling current in the insulating oxide of the floating gate. In actual operation, different threshold voltages applied to the excitatory-connection and inhibitory-connection transistors 102 and 106 can be utilized to produce different synaptic weights for the neuron, so that the output voltage $U_i$ presented at the output line 30 will depend on the voltages $U_j$ and $X_k$ of the input signals at the control lines 20 and the threshold voltages applied to the excitatory-connection and inhibitory-connection transistors 102 and 106.

The basic neuron element 10 can be utilized to construct a computational element of an artificial neural network. In this way, since all computational elements of the artificial neural network and their conductance factors and parasitic capacitors $C_p$ are the same, the connection strengths of the artificial neural network only can be adjusted by the programmable threshold voltages of the excitatory-connection and inhibitory-connection transistors 102 and 106. Such a nonlinear network can be described by the following dynamic equation:

$$\frac{dU_i}{dt} = K\left[\sum_{j=1}^{N} F_{ij}(U_j, U_i, V_{Tij}) + \sum_{j=N+1}^{N+M} F_{ij}(X_{j-N}, U_i, V_{Tij})\right]$$

$F_{ij}(U_j, U_i, V_{Tij}) =$ $$\begin{cases} f(U_j - U_i, V_{DD} - U_i, V_{Tij}) \ldots \text{Excitatory Connection} \\ -f(U_j, U_i, V_{Tij}) \ldots \text{Inhibitory Connection} \end{cases}$$

$$i = 1, \ldots, N; j = 1, \ldots, N + M$$

wherein K is the ratio of the conductance factor of the transistor and the parasitic capacitance of the neuron; $V_{DD}$ is the power source voltage; N is the number of neurons; M is an input number externally applied to the network; f is the characteristic function of floating-gate MOS transistor; and $V_T$ is the threshold voltage of the floating-gate transistor. The first item in brackets of the above equation describes the feedback network portion, and the second item describes the feedforward network portion. This artificial neural network is constructed on the basis of the nonlinear characteristics of floating-gate transistors.

Figure 2:
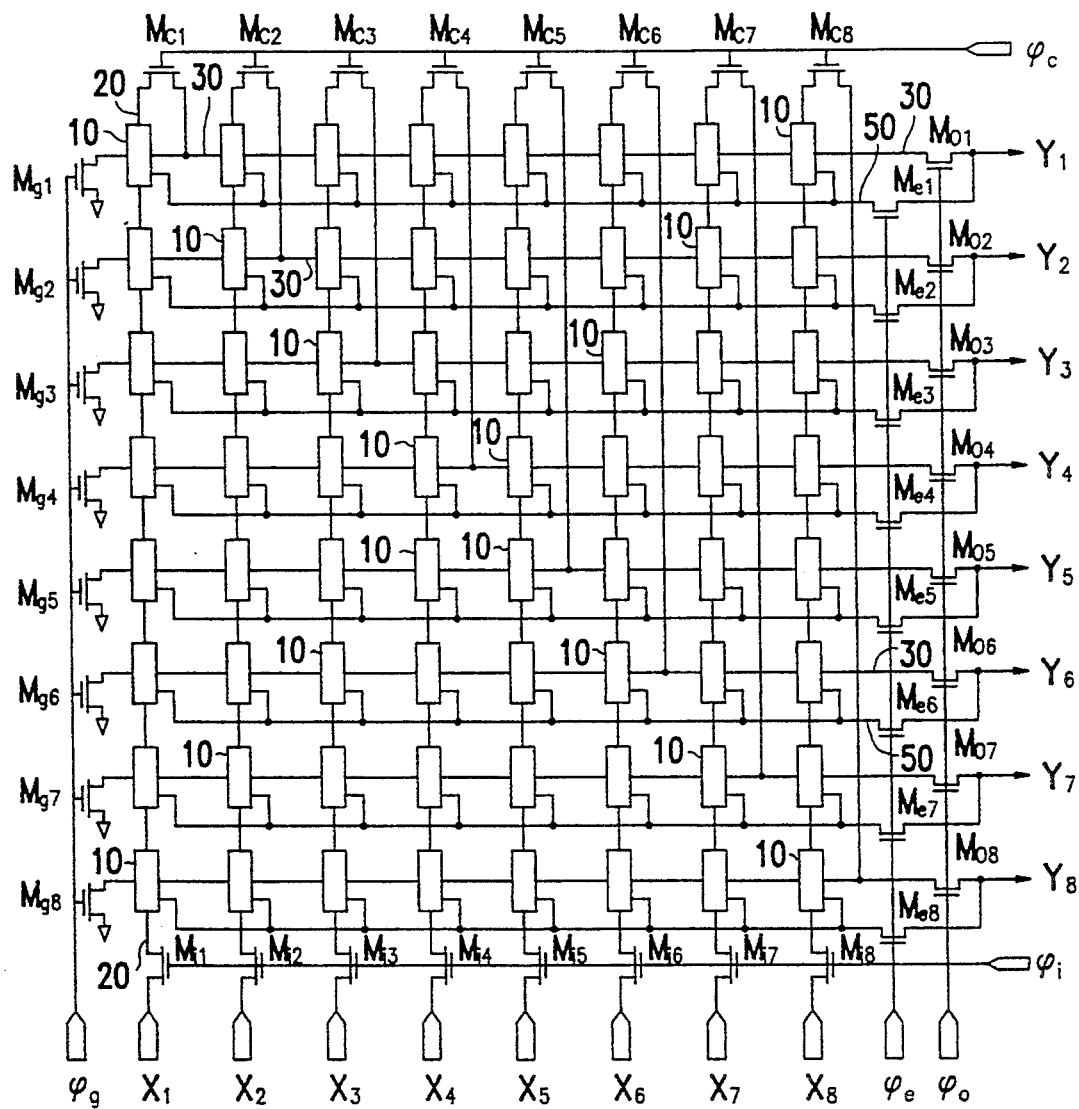
FIG. 2 is a schematic block diagram of a neural network mainly constituted by sixty four (8×8) basic neuron elements as shown in FIG. 1.

One example of the artificial neural network according to the present invention is shown in FIG. 2. It is very suitable for fabrication as an integrated circuit by floating-gate NMOS technology. The artificial neural network includes a basic network portion, an operation control portion, and a programming control portion. The basic network portion is constituted by sixty four (8×8) basic neuron elements 10 which are represented by blocks corresponding to the blocks of phantom line as shown in FIG. 1, and includes eight neurons constituted respectively by eight rows of the basic neuron elements 10. The operation control portion includes eight connection-state control transistors $M_{c1}$ through $M_{c8}$ controlled by a control signal $\phi_c$, eight reset control transistors $M_{g1}$ through $M_{g8}$ controlled by a control signal $\phi_g$, and eight input signal control transistors $M_{i1}$ through $M_{i8}$ controlled by a control signal $\phi_i$. The programming control portion includes eight excitatory-connection programming control transistors $M_{o1}$ through $M_{o8}$ controlled by a control signal $\phi_o$, and eight inhibitory-connection programming control transistors $M_{e1}$ through $M_{e8}$ controlled by a control signal $\phi_e$.

The connections between the basic neuron elements 10 in the same row are identical to those shown in FIG. 1, and the eight control lines 20 of all rows of the basic neuron elements 10 are connected respectively to eight input signals $X_1$ through $X_8$ via the input signal control transistors $M_{i1}$ through $M_{i8}$. The transistors $M_{i1}$ through $M_{i8}$ are utilized to allow entrances of the input signals $X_1$ through $X_8$, and to isolate the neural network from the input signals in order to protect the contents in the neural network. The output line 30 of the first row (counting from top to bottom) of basic neuron elements 10 is further connected to the control line 20 of the first basic neuron element 10 (counting from left to right) in the first row via the connection-state control transistor $M_{c1}$. The output line 30 of the second row of basic neuron elements 10 is connected to the control line 20 of the second basic neuron element 10 in the first row via the connection-state control transistor $M_{c2}$. The output line 30 of the third row of basic neuron elements 10 is connected to the control line 20 of the third basic neuron element 10 in the first row via the connection-state control transistor $M_{c3}$. The output line 30 of the fourth row of basic neuron elements 10 is connected to the control line 20 of the fourth basic neuron element 10 in the first row via the connection-state control transistor $M_{c4}$. The output line 30 of the fifth row of basic neuron elements 10 is connected to the control line 20 of the fifth basic neuron element 10 in the first row via the connection-state control transistor $M_{c5}$. The output line 30 of the sixth row of basic neuron elements 10 is connected to the control line 20 of the sixth basic neuron element 10 in the first row via the connection-state control transistor $M_{c6}$. The output line 30 of the seventh row of basic neuron elements 10 is connected to the control line 20 of the seventh basic neuron element 10 in the first row via the connection-state control transistor $M_{c7}$. The output line 30 of the eighth row of basic neuron elements 10 is connected to the control line 20 of the eighth basic neuron element 10 in the first row via the connection-state control transistor $M_{c8}$. In this way, when the control signal $\phi_c$ is at a high voltage level, transistors $M_{c1}$ through $M_{c8}$ are turned on, and the neural network is in a feedback operation state. When the control signal $\phi_c$ is at a low voltage level, transistors $M_{c1}$ through $M_{c8}$ are turned off, and the neural network is in a non-feedback operation state. When the control signal $\phi_g$ is at a high voltage level, transistors $M_{g1}$ through $M_{g8}$ are turned on, and the output lines 30 of all rows are reset to ground. The excitatory-connection programming control transistors $M_{o1}$ through $M_{o8}$ are also utilized to allow the voltage level at the output lines 30 to be output as the output signals $Y_1$ through $Y_8$.

To program the excitatory-connection transistors of the basic neuron elements 10, the control signal $\phi_o$ and $\phi_i$ are at "HIGH", and other control signals are at "LOW". Then, voltages are applied to one of the input nodes $X_1$ through $X_8$ and one of the output nodes $Y_1$ through $Y_8$ to program a selected excitatory-connection transistor. For example, if a positive voltage is applied to the selected control line 20 via the input node $X_1$, and a negative voltage is applied to the selected output line 30 via the output node $Y_1$, the threshold voltage of the excitatory-connection transistor in the first basic neuron element 10 of the first row is increased. If a negative voltage is applied to the input node $X_3$, and a positive voltage is applied to the output node $Y_6$, the threshold voltage of the excitatory-connection transistor in the third basic neuron element 10 of the sixth row is decreased. To program the inhibitory-connection transistors of the basic neuron elements 10, the control signal $\phi_e$ and $\phi_i$ are at "HIGH", and other control signals are at "LOW". Then, voltages are applied to one of the input nodes $X_1$ through $X_8$ and one of the output nodes $Y_1$ through $Y_8$ to program a selected inhibitory-connection transistor. For example, if a positive voltage is applied to the selected control line 20 via the input node $X_1$, and a negative voltage is applied to the selected programming line 50 via the output node $Y_1$, the threshold voltage of the inhibitory-connection transistor in the first basic neuron element 10 of the first row is increased. If a negative voltage is applied to the input node $X_3$, and a positive voltage is applied to the output node $Y_6$, the threshold voltage of the inhibitory-connection transistor in the third basic neuron element 10 of the sixth row is decreased.

The neural network shown in FIG. 2 can be fabricated as an $8 \times 8$ fully interconnected neural network single-chip. It is composed of 128 programmable floating-gate NMOS transistors, and constructs a fully interconnected network with eight neurons. The neural network has the features of continuously-changed synaptic weights, simple structure, small element size, etc. The same chips can be cascaded to form a larger network because the neural network of the present invention has the characteristic of distributed neuron structure.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A neuron element with electrically programmable synaptic weight for an artificial neural network comprising:

an excitatory-connected floating-gate transistor having a floating gate, a control gate electrode for receiving an input signal, a drain electrode for connection to a power source voltage, a source electrode for connection to an output line, and a programming electrode connected to said source electrode, said control gate electrode and said programming electrode being utilized to program the threshold voltage of said excitatory-connected floating-gate transistor, and thus the synaptic weight of said neuron element; and an inhibitory-connected floating-gate transistor having a floating gate, a control gate electrode to receive said input signal, a drain electrode connected to said source electrode of said excitatory-connected floating-gate transistor, a source electrode for connection to ground, and a programming electrode, said control gate electrode and said programming electrode of said inhibitory-connected floating-gate transistor being utilized to program the threshold voltage of said inhibitory-connected floating-gate transistor, and thus the synaptic weight of said neuron element.

2. A neuron element as claimed in claim 1, wherein said excitatory-connected and inhibitory-connected floating-gate transistors are NMOS transistors.

* * * * *